(No Model.)

C. B. ROHLAND.
REAMER.

No. 460,802. Patented Oct. 6, 1891.

Witness:
C. B. Bull
James F. Duhamel

CHARLES B. ROHLAND,
Inventor,
by Dodge & Sons,
Attys.

UNITED STATES PATENT OFFICE.

CHARLES B. ROHLAND, OF NEW PORTAGE, OHIO.

REAMER.

SPECIFICATION forming part of Letters Patent No. 460,802, dated October 6, 1891.

Application filed July 23, 1891. Serial No. 400,485. (No model.)

*To all whom it may concern:*

Be it known that I, CHARLES B. ROHLAND, a citizen of the United States, residing at New Portage, in the county of Summit and State of Ohio, have invented certain new and useful Improvements in Reamers, of which the following is a specification.

My invention relates to reamers; and it consists in a novel construction of the same, as hereinafter set forth and claimed.

Figure 1:
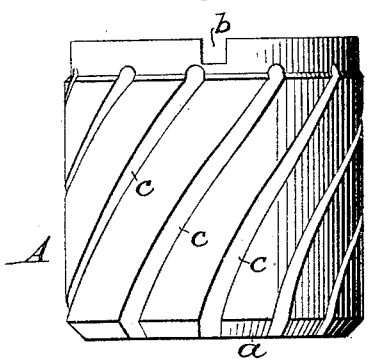
Figure 2:
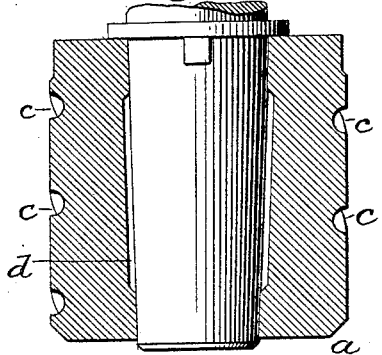

In the drawings, Figure 1 is a side elevation of my improved reamer; Fig. 2, a vertical longitudinal sectional view, and Figs. 3 and 4 views of the reamer from opposite ends.

Figure 3:
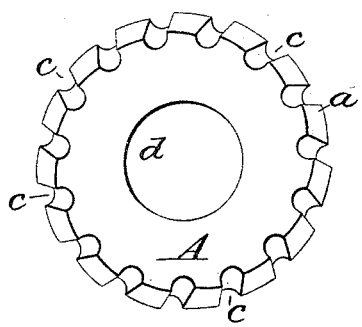
Figure 4:
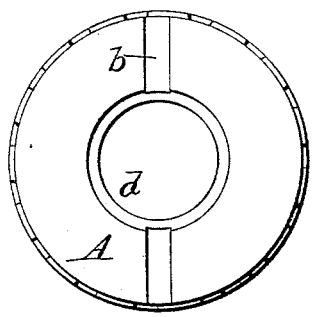

A indicates the body of the reamer, having a beveled nose $a$ at one end and a cross-slot $b$ at the other end. In the periphery of the body of the reamer I form a series of grooves or flutings $c$, which extend lengthwise at an angle of about seventy-two degrees, more or less, the said flutes also extending across the face of the beveled edge or nose, as shown in Figs. 1 and 3. The main body of the reamer will be provided with a central hole or opening $d$, preferably tapering, to receive the mandrel, arbor, or other tool-holding device. Where the taper of the mandrel does not agree with the taper of the opening $d$ a pin will be passed through the mandrel and seat itself in the slot $b$, thereby preventing the mandrel from turning within the reamer.

To prevent wabbling or rocking upon the mandrel in case the tapers should not correspond, the opening $d$ is enlarged within the reamer, as shown in Fig. 2.

In constructing a reamer such as shown I take a piece of hard tool-steel and turn it to proper size. It is then grooved or fluted and the requisite clearance given by means of an emery-wheel or other grinder.

By making the grooves or flutings at an angle the cuttings pass away from the cutting-edge of the groove or flute and work their way up and out, instead of choking up the groove, as they do where the reamer has grooves parallel with the axis. Unless the cuttings work their way out rapidly they cause the cutting-edge to become heated and either wear away unduly or stick in the opening, something I have demonstrated practically will not occur with reamers constructed in accordance with my invention.

Having thus described my invention, what I claim is—

1. A reamer having a beveled nose and a series of inclined peripheral grooves or flutings.

2. A reamer having a beveled nose and a series of flutes or grooves inclined as shown and extending across the beveled nose.

3. A reamer having a beveled nose, a series of spiral grooves or flutings, and a central opening.

In witness whereof I have hereunto set my hand in the presence of two witnesses.

CHARLES B. ROHLAND.

Witnesses:
   JNO. H. STODDARD,
   JAS. MCNAMARA.